UNITED STATES PATENT OFFICE.

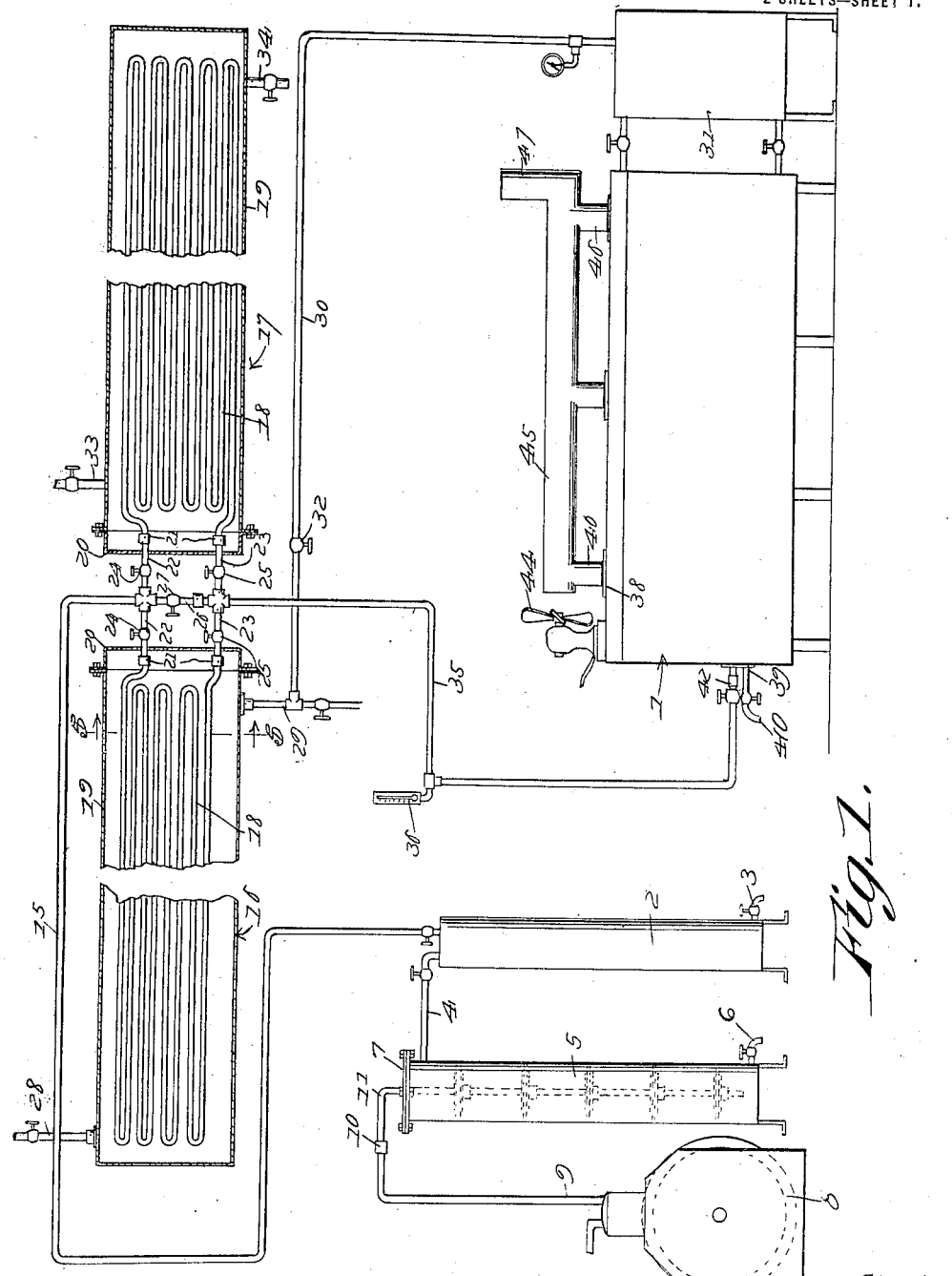

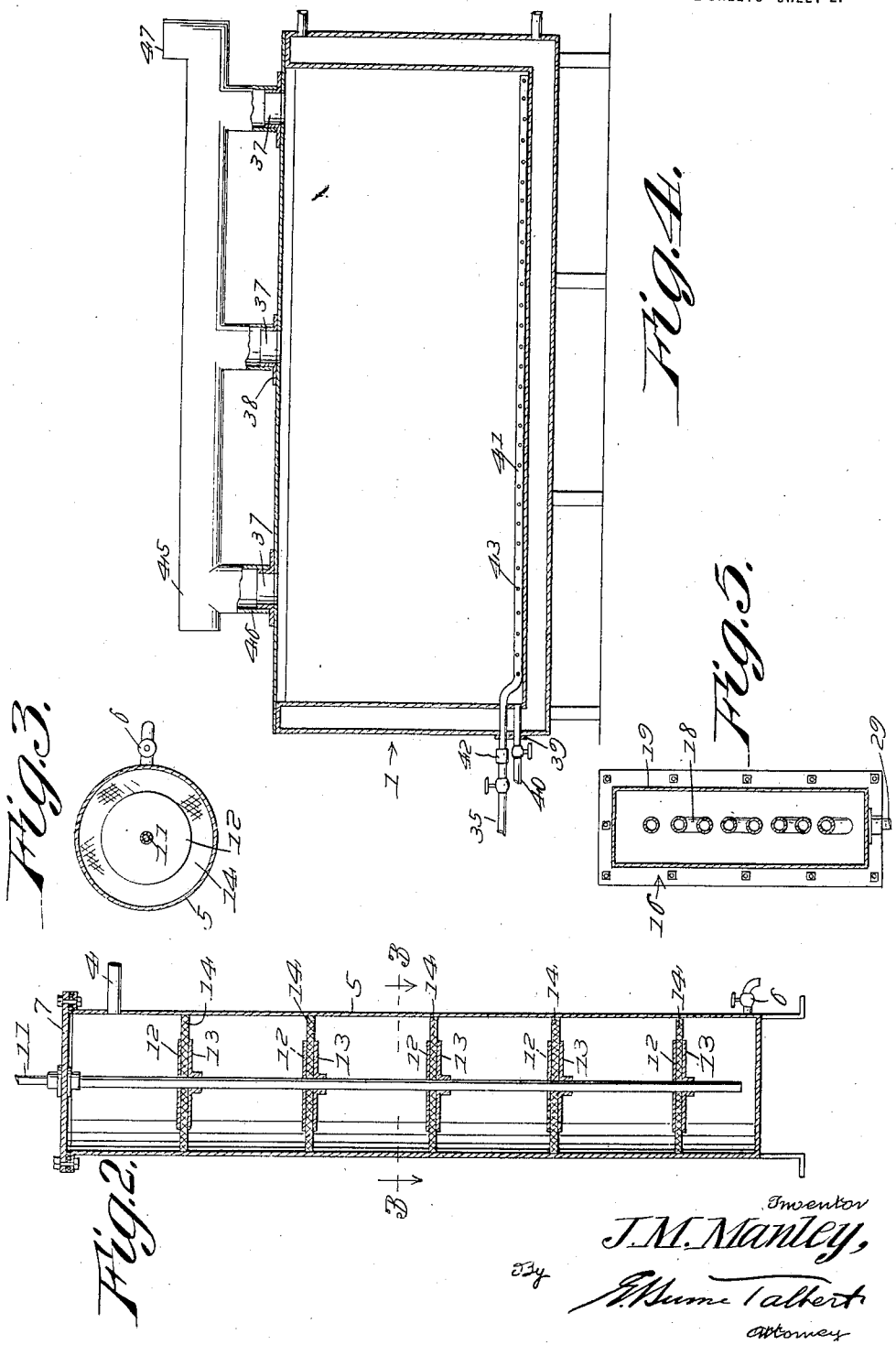

JOHN M. MANLEY, OF MONTGOMERY, ALABAMA.

APPARATUS FOR THE TREATMENT OF MILK.

1,380,230.   Specification of Letters Patent.   Patented May 31, 1921.

Application filed April 24, 1920. Serial No. 376,223.

*To all whom it may concern:*

Be it known that I, JOHN M. MANLEY, a citizen of the United States, residing at Montgomery, in the county of Montgomery and State of Alabama, have invented new and useful Improvements in Apparatus for the Treatment of Milk, of which the following is a specification.

The object of the invention is to provide apparatus for use in conjunction with a pasteurizer by which the work in connection with the preserving of milk, is made easier. Provision is made for the vaporizing of the milk, the heating or cooling of the same, and maintaining it at any temperature desired. To this end, a compressed air reservoir is provided with means for supplying the same, and the air before entering the reservoir is filtered to insure its being pure. From the reservoir, the air is conducted as desired to the heating or to the cooling apparatus and from the latter to the contents of the pasteurizer, from which it is distributed at the bottom of the contents, rising through the contents to be ejected from the pasteurizer by an air fan and a suitable outlet member or vapor carrier. The heating and cooling apparatus are inter-connected so that the air may be tempered prior to its passage to the pasteurizer and provision is made for conducting the air direct to the pasteurizer from the reservoir when desired.

The invention is illustrated in a specific embodiment to which, however, it is not to be restricted. The right is reserved to make such changes or alterations as the actual reduction to practice may suggest, in so far as such changes or alterations are compatible in spirit with the annexed claims.

In the accompanying drawings:—

Figure 1, is a view of the lay-out of the improved apparatus, certain of the parts of which are shown in section.

Fig. 2, is an enlarged vertical sectional view through the air filter.

Fig. 3, is a transverse sectional view of the structure of Fig. 2 on the line 3—3 of the latter.

Fig. 4, is a vertical longitudinal sectional view through the pasteurizer.

Fig. 5, is a section on the line 5—5 of Fig. 1.

The milk to be aerated is placed in the pasteurizer 1, which may be of any acceptable make and of any desired shape. The air for the aerating process is received from the air reservoir 2, an ordinary form of tank equipped with drain cock 3 adjacent its bottom for the obvious purpose of providing for cleaning and draining out foreign contents. The inlet and outlet for the reservoir 2, are provided in the top of the latter, the inlet pipe 4, conducting the air to the reservoir from the filter 5 which is a tank similar in shape to the tank 2, and provided with a drain cock 6 for cleaning purposes. The filter 5, however, is provided with a flanged cover 7 bolted or otherwise secured on the top of the tank which is formed with a flange for contact with the flange of the cover. Air is received into the filter from an air compressor 8 of any acceptable make and from which a pipe 9 is led and coupled, as at 10, to the pipe 11 which is connected to the cover 7 and passes through the same and is centrally disposed within the filter 5 with its outlet a few inches above the bottom of the filter tank. Within the filter tank 5 fixedly secured to that portion of the pipe 11 interior to the tank, there are the plates 12 spaced uniform distances apart. Coöperating with each of these plates 12 there is a plate 13 adjustable as to position on the pipe 11 and adapted for clamping operation in connection with the associated plate 12 so as to hold the filtering medium 14 which is preferably felt and which extends to and contacts with the interior walls of the tank 5. The outlet for the filter is in the side of the tank 5 and just below the cover, the pipe 4 connecting with this outlet. Thus the air delivered by the compressor passes through the pipes 9 and 11 and leaves the latter pipe at the bottom of the tank, rising in the tank 5 and passing through the felt by which the impurities are extracted, thence passing through pipe 4 and into the reservoir 2 at the top. The air in the reservoir leaves the latter through pipe 15 from which it is admitted to either the heating or cooling apparatus indicated generally at 16 and 17. Except for functioning differently, the apparatus 16 and 17 are identical and each comprises a pipe coil 18 made by straight lengths of pipe interconnected by return elbows. Each coil is inclosed by a jacket or casing 19 provided at one end with a removable cover 20 peripherally flanged for connection with a corresponding flange on the end of the jacket. The heating and cooling devices 16 and 17 are disposed with their cover ends facing and each cover has set therein 2 nipples the inner ends of which connect with the terminal sections of the coils by means of ground unions 21. The pipe 15 has branch connections 22 with the inlet ends of each coil 18 and branch connections 23 with the outlet ends of the same, these connections being made with the nipples in the covers by means of unions or running threads. Valves 24 are interposed in the inlet branch connections and valves 25 in the outlet branch connections. That portion of the pipe 15 connecting with the outlet branch connections constitutes a by-pass 26 which carries a valve 27. A similar pipe 28 connects with the jacket 19 of the heating apparatus 16 for the admission of steam into the jacket and around the coil 18 thereof, this jacket having a valve-controlled steam outlet 29 connected with which between the jacket and the valve there is a pipe 30 which is led to and discharges into the water-heating chamber 31 which is a part of the pasteurizer 1. Valve 32 controls this pipe 30.

The cooling apparatus 18 performs its function through the instrumentality of brine admitted to its jacket 19 through a brine pipe 33, the brine being circulated by any suitable means and leaving the jacket through the outlet pipe 34.

The air from the reservoir 2 is cooled or heated as it is admitted to the heating or cooling apparatus. If the air is to be heated the valve 27 in the pipe 26 is closed and the valve 24 in the heater inlet branch of the pipe 15 is opened, the valve 25 in the outlet branch of the heater being also opened. The air thus passes into the coil 18 of the heating apparatus and the steam circulating around the coil, heats the air so that when it passes out of the branch pipe 23 of the heater, it is of the desired temperature.

If the air is to be cooled, the valves 24 and 25, controlling the inlet and outlet of the heater are closed and the corresponding valves for the cooler opened. The air is thus directed into the coil 18 of the cooler and leaving the latter is of the desired low temperature. It is obvious that the air may be tempered as desired by passing it partly through the heater and partly through the cooler, the volumes passing between the two re-uniting at the juncture of the by-pass 26 with the outlet branches of both the heater and the cooler, where the one tempers the other, so that the desired temperature of air is obtained.

The pipe constituting the by-pass 26 connects with the pipe 35 which is led to the pasteurizer. The desired temperature of air having been obtained, the latter is passed through this pipe to perform its function on the contents of the pasteurizer. It is possible to conduct the air from the reservoir to the pasteurizer without passing it through either the heater or the cooler. In this case, the valves 24 and 25 are closed and the valve 27 opened. By this a direct passage of the air from the pipe 15 to the pipe 35 is permitted. A thermometer 36 is disposed for convenience in the pipe 35, so that the temperature of air passing therethrough may be readily ascertained.

The milk to be treated is put into the pasteurizer 1 through the filling mouths 37 formed on top of the latter and provided with peripheral flanges 38 and the air with which the milk is to be impregnated is admitted at the bottom of the pasteurizer which is formed with an opening in which there is disposed a plate 39 having connected with it a sanitary milk outlet 40. The pipe 35 connects with the air distributer 41, one terminal of which is secured to the plate 39 and passing through the latter is coupled to the pipe 35 as indicated at 42. The air distributer 41 is nothing more than a pipe extending substantially the length of the pasteurizer but disposed in the latter and adjacent to the bottom and provided with a plurality of spaced perforations or holes 43. The air received direct from the reservoir or through the heating or cooling apparatus is thus admitted to the air distributer and leaves the latter through the perforations 43 finding its way up through the contents of the pasteurizer and aerating the same.

That the vapor produced in the process may be readily disposed of, a fan 44 is mounted on top of the pasteurizer for operation from a line shaft or by individual motor or any accessible means. This fan is designed to discharge a blast of air through a tubular vapor carrier 45 which is made preferably of triple-plate tin and about 12 inches in diameter. The vapor carrier is designed for detachable connection with the pasteurizer at the filling mouths thereof and to this end is provided with lateral branches or legs 46 telescopically engaging the peripheral flanges of the filling mouths when the vapor carrier is attached, the fan 44 being disposed in the tubular vapor carrier at one end when the vapor carrier is in position on the pasteurizer. The outlet end of the vapor carrier constitutes the upturned terminal 47 through which the blast of air from the fan is discharged as well as the vapor arising from the aerating process, the vapor passing into said carrier through the legs 46.

The invention having been described, what is claimed as new and useful is:—

1. An apparatus for the purpose indicated comprising an air reservoir and means for supplying the same with compressed and filtered air, air tempering means, connections between the reservoir and the tempering means, a pasteurizer, connections between the pasteurizer and the tempering means, and means for the regulation of the tempering means whereby a prescribed temperature of air may be obtained.

2. Apparatus for the purpose indicated comprising an air reservoir and means for supplying the same with compressed and filtered air, heating and cooling means, connections between the reservoir and the heating and cooling means, a pasteurizer, connections between the pasteurizer and the heating and cooling means, and means for the selective use of the heating and cooling means whereby a prescribed temperature of the air may be obtained.

3. Apparatus for the purpose indicated comprising a compressed air supply means, a pair of jacketed coils for contact respectively with heating and cooling media, a pasteurizer, connections between the supply means and the coils and the coils and the pasteurizer, and means for selectively passing air through one or the other of the coils or the two coils in common to obtain a prescribed temperature of air.

4. Apparatus for the purpose indicated comprising a compressed air supply means, a pair of jacketed coils, designed for contact respectively with heating and cooling media, connections between the supply means and the coils and the coils and the pasteurizer, an air distributer consisting of a perforated pipe disposed in the bottom of the pasteurizer, connections between the coils and the distributer, said connections between the supply means and the coils and the distributer embodying selective controls for the passing of compressed air through one or the other of the coils, or the two in common for obtaining a prescribed temperature of air.

In testimony whereof I affix my signature.

JOHN M. MANLEY.